United States Patent [19]

Kido et al.

[11] 4,415,650

[45] Nov. 15, 1983

[54] RECORDING MATERIAL

[75] Inventors: Keishiro Kido; Minoru Wada; Fumiaki Shinozaki; Tomoaki Ikeda, all of Asaka, Japan

[73] Assignee: Fuji Photo Film Co., Ltd., Kanagawa, Japan

[21] Appl. No.: 915,689

[22] Filed: Jun. 14, 1978

[30] Foreign Application Priority Data

Jun. 14, 1977 [JP] Japan .................................. 52-70848
Jun. 15, 1977 [JP] Japan .................................. 52-70851

[51] Int. Cl.³ ....................... G01D 15/34; G03F 7/00; G11B 3/70; G11B 7/00; G11B 7/24
[52] U.S. Cl. .................................. 430/273; 346/76 L; 346/135.1; 427/255.2; 427/255.6; 427/255.7; 428/457; 428/461; 428/463; 428/913; 430/320; 430/330; 430/346; 430/945
[58] Field of Search ............... 96/114.1, 94 BF; 427/248 H, 255.6, 255.2, 255.7; 346/135, 135.1, 76 L; 428/913, 457, 461, 463; 430/945, 350, 351, 495, 405, 272, 320, 330, 346

[56] References Cited

U.S. PATENT DOCUMENTS

| | | | |
|---|---|---|---|
| 3,560,994 | 2/1971 | Wolff et al. | 430/945 |
| 3,687,664 | 8/1972 | Broodbent . | |
| 3,751,285 | 8/1973 | Ruckert et al. | 96/91 D |
| 3,901,994 | 8/1975 | Mehalso et al. | 427/248 H |
| 3,978,247 | 8/1976 | Brandy | 346/76 L |
| 4,000,492 | 12/1976 | Willens | 430/945 |
| 4,008,084 | 2/1977 | Ikeda et al. | 427/255.6 |
| 4,023,185 | 5/1977 | Bloom | 346/135.1 |
| 4,032,690 | 6/1977 | Kohmura et al. | 428/913 |
| 4,032,691 | 6/1977 | Kido et al. | 428/913 |
| 4,037,075 | 7/1977 | Pugsley et al. | 346/76 L |
| 4,048,349 | 9/1977 | White et al. | 427/255.6 |
| 4,054,712 | 10/1977 | Nagashima et al. | 428/908 |
| 4,097,230 | 6/1978 | Sandhu | 427/248 H |
| 4,142,898 | 3/1979 | Izu | 430/162 |
| 4,173,677 | 11/1979 | Nakano et al. | 428/913 |
| 4,188,214 | 2/1980 | Kido et al. | 430/495 |
| 4,198,237 | 4/1980 | Nahara et al. | 430/495 |
| 4,214,249 | 7/1980 | Kasai et al. | 428/913 |
| 4,271,256 | 6/1981 | Kido et al. | 430/495 |

FOREIGN PATENT DOCUMENTS 2706392 8/1977 Fed. Rep. of Germany ... 427/248 H

OTHER PUBLICATIONS

Baker, *Thin Solid Films*, 8 (1971), R13–R15, No. 3.

*Primary Examiner*—James C. Cannon
*Attorney, Agent, or Firm*—Sughrue, Mion, Zinn, Macpeak and Seas

[57] ABSTRACT

A recording material having high sensitivity and providing good image quality comprising a support having thereon a recording layer thermally deformable by exposure to high intensity radiation, which recording layer comprises (1) a vacuum deposited layer of at least one organic compound selected from the group consisting of organic carboxylic acids, organic carboxylic acid salts, organic carboxylic acid esters, aromatic sulfonic acids, organic acyclic sulfur compounds, nitrogen-containing heterocyclic compounds, sulfur-containing heterocyclic compounds, organic macromolecular compounds, dyes and pigments, or (2) a vacuum co-deposited layer of a mixture of (a) at least one of the organic compounds described above and (b) at least one inorganic material selected from the group consisting of a metal or a metal compound.

24 Claims, 4 Drawing Figures

RECORDING MATERIAL

BACKGROUND OF THE INVENTION

1. Field of the Invention

This invention relates to a recording material having a recording layer which is thermally deformed by exposure to high intensity radiation.

2. Description of the Prior Art

Recording materials utilizing heat for image recordation are known. Information is recorded in these materials by exposing a recording layer to information-carrying high intensity radiation, such as laser light, to cause a certain thermal deformation, such as fusion, evaporation, aggregation or the like, to occur in the recording layer in the exposed areas due to the heat of the radiation used. Consequently, the optical characteristics in the thermally deformed areas of the recording layer are changed to form a visible image. Various techniques suitable for exposure using high intensity radiation applicable to a recording method using the thermal recording materials as described above can be employed. For instance, one technique includes the two steps of transforming the information to be recorded into electric time sequential signals, and scanning the recording material with laser light whose intensity is modulated by the electric time sequential signals; and another technique involves a two-dimensional exposure using a strobe light or a one-dimensional exposure of scanning with a laser light through a two-dimensional, optical information. In many cases, thermal deformation can be achieved in the recording materials merely by exposure to radiation for a very short time and, therefore, in general, post-treatments such as development are unnecessary for completing the recorded image because exposure to radiation is all that is necessary for completion of recording.

The recording layers of thermal recording materials as described above can be made of inexpensive metals, dyes, synthetic resins or other inexpensive materials. However, in order to obtain highly sensitive thermal recording materials, the recording layers thereof should be made of particular metals or should have various specific constructions. Various proposals for attaining such have been made. For instance, a recording layer of three layers, i.e., a germanium layer, a bismuth layer and a selenium layer, is disclosed in U.S. Pat. No. 3,560,994. In such a recording layer, the germanium layer lowers the reflectance, from the bismuth layer, of light used for exposure, and the selenium layer has a tendency to evaporate. Either factor described above accelerates the thermal deformation occurring in the bismuth layer corresponding to the main recording layer, and reduces the energy required for thermally deforming the recording layer, compared with the case where a bismuth layer alone is employed as a recording layer. Other layers provided on the main recording layer with the intention of further reducing reflectance or preventing reflection are disclosed in Japanese Patent Application (OPI) No. 151151/75 (The term "OPI" as used herein refers to a "published unexamined Japanese patent application".) and Japanese Publication No. 14263/76. Moreover, in order to decrease heat conduction from the recording layer to the support, a certain layer may be disposed between the recording layer and the support, as disclosed in U.S. Pat. Nos. 4,032,691 and 3,911,444. Furthermore, a double layer obtained by superposing a layer of a metal sulfide, a metal fluoride or a metal oxide upon a metal layer, or a single layer of a mixture of a metal and a metal sulfide, a metal fluoride or a metal oxide as a recording layer, which is disclosed in Japanese Patent Application (OPI) Nos. 78236/76 and 20821/77 has been used. Such being the case, it has been desired to discover recording materials having a sensitivity improved to such an extent that it is almost equal to or higher than the sensitivity attained using the various kinds of recording materials described above.

SUMMARY OF THE INVENTION

Therefore, an object of the present invention is to provide a novel thermal recording material having high sensitivity.

Another object of the present invention is to provide a highly sensitive thermal recording material which can be used to produce recorded images of high quality.

Still another object of the present invention is to provide a highly sensitive recording material which does not give rise to environmental pollution.

A further object of the present invention is to provide a highly sensitive recording material which can be produced inexpensively and with a reduced number of production steps.

The above-described objects are attained as follows.

In a first embodiment, this invention provides a recording material having high sensitivity and providing good image quality comprising a support having thereon a recording layer thermally deformable by exposure to high intensity radiation, which recording layer comprises a vacuum deposited layer of at least one organic compound selected from the group consisting of organic carboxylic acids, organic carboxylic acid salts, organic carboxylic acid esters, aromatic sulfonic acids, organic acyclic sulfur compounds, nitrogen-containing heterocyclic compounds, sulfur-containing heterocyclic compounds, organic macromolecular compounds, dyes and pigments.

In a second embodiment, this invention provides a recording material having high sensitivity and providing good image quality comprising a support having thereon a recording layer thermally deformable by exposure to high intensity radiation, which recording layer comprises a vacuum co-deposited layer of a mixture of (a) at least one of the organic compounds described above and (b) at least one inorganic material selected from the group consisting of a metal or a metal compound.

Figure 1:
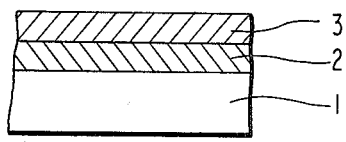
FIGS. 1 to 4 are cross section diagrams of layers of recording materials of the present invention.

In each of the figures, layer 1 is a support, layer 2 is a layer of an organic compound as described above or a layer of a mixture of an organic compound as described above and an inorganic material formed using a vacuum deposition technique or a vacuum co-deposition technique, respectively, and layer 3 is a metal layer, an inorganic compound layer, a layer of a mixture of a metal and an inorganic compound, or a composite layer formed by superposing these above-described layers upon one another.

DETAILED DESCRIPTION OF THE INVENTION

Supports which can be employed in the embodiments of the present invention described hereinbelow include all supports generally used in conventional recording materials, such as synthetic resins, paper, glass and so on.

The term "light" or "high intensity radiation" as used herein is intended to include any light capable of thermally deforming the recording layer of a recording material exposed thereto, with specific examples including concentrated laser light, strobe light and the like. Suitable supports can be selected depending upon the purpose of end-use, but, in general, synthetic resins such as polyethylene terephthalate are preferably used because of their good flexibility and low thermal conductivity.

The term "thermal deformation" as used herein means deformation caused by heat, with specifically such deformation being caused by, e.g., fusion, evaporation, aggregation and like phenomena. Thermal energy must be supplied to the areas exposed in a magnitude sufficient to deform such areas to such an extent that the thus produced deformation results in differences large enough to be readily detected optically, e.g., by transmittance, reflectance, efficiency of light scattering, etc., between the areas deformed and the areas not exposed and, consequently, not deformed.

In a first embodiment of the recording material of the present invention, the recording material basically comprises a support having thereon a recording layer thermally deformable on exposure to high intensity radiation with the recording layer comprising a vacuum deposited layer of at least one organic compound as described in detail below.

A wide variety of organic compounds can be employed as organic compounds suitable for use in this first embodiment of the present invention. The essential requisites of such organic compounds is that they must be solid at normal temperatures (15° to 30° C.) and they must be capable of being evaporated in vacuo. It is desirable for the melting point and the subliming temperature of the organic compounds to be as low as possible. A suitable melting point range and subliming temperature range is about 50° C. to about 350° C. Further, it is desirable for the stability thereof to be high both before and after vacuum deposition. However, many organic compounds can melt or sublime at a temperature of about 350° C. or lower. Accordingly, most organic compounds can be employed in the present invention.

Preferred organic compounds which can be employed in this first embodiment of the present invention are organic carboxylic acids, e.g., having 10 to 22 carbon atoms which may be substituted, with specific examples including higher fatty acids such as behenic acid, stearic acid, palmitic acid, myristic acid, linolenic acid, oleic acid, etc.; aromatic ring-containing mono- and poly-carboxylic acids, e.g., having 7 to 12 carbon atoms, such as benzoic acid, phthalic acid, isophthalic acid, pyromellitic acid, anisic acid, coumarinic acid, cinnamic acid, etc.; polycarboxylic acids, e.g., having 2 to 10 carbon atoms and having 2 to 4 carboxyl groups including saturated and unsaturated polycarboxylic acids, such as fumaric acid, succinic acid, sebasic acid, oxalic acid, pimelic acid, maleic acid, citraconic acid, mesaconic acid, etc.; abietic acid; and the like. The salts and the esters of these organic carboxylic acids can also be advantageously used in this first embodiment of the recording material of the present invention. Suitable carboxylic acid metal salts include those of Na, K, Ca, Mg, Cu, Fe, Al, Co, Cr, etc. The organic carboxylic acid esters can be those containing moieties of the above described carboxylic acids with an alcohol moiety, e.g., an aliphatic alcohol moiety having 1 to 30 carbon atoms, an alicyclic alcohol moiety such as that of cyclopentanol, cyclohexanol, etc., an aromatic alcohol moiety having 6 to 14 carbon atoms such as that of benzyl alcohol, cinnamyl alcohol, etc., a dihydric alcohol moiety having 2 to 30 carbon atoms such as that of ethylene glycol, propylene glycol, trimethylene glycol, 1,5-pentanediol, etc., a trihydric alcohol moiety such as that of glycerin.

Moreover, aromatic sulfonic acids having 6 to 14 carbon atoms, e.g. sulfanilic acid, p-toluenesulfonic acid, phenolsulfonic acid, catecholsulfonic acid, resorcinsulfonic acid, naphthalene-2-sulfonic acid, acenaphthene-5-sulfonic acid, benzaldehyde-2(or 3)-sulfonic acid, oxybenzylsulfonic acid, etc. can also be advantageously used.

Other preferred organic compounds which can be employed in this first embodiment of the recording material of the present invention are organic acyclic sulfur compounds with specific examples including thioureas and the derivatives thereof, e.g., thioureas as represented by the following formula:

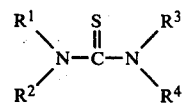

wherein $R^1$ to $R^4$ each is a hydrogen atom, an alkyl group having 1 to 5 carbon atoms, a hydroxyalkyl group having 1 to 5 carbon atoms, or a phenyl group; wherein $R^1$ and $R^2$ or $R^3$ and $R^4$ may be bonded to form a 5-membered heterocyclic ring such as a pyrrolidine ring;

e.g., thiourea, ethylenethiourea, trimethylthiourea, N,N'-dimethylolthiourea, etc.;

thiosemicarbazides such as dithizone and the derivatives thereof, e.g., thiosemicarbazides and thiocarbazides as represented by the following formulae:

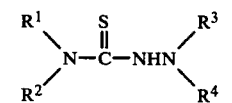

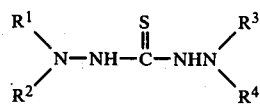

wherein $R^1$ to $R^4$ each is a hydrogen atom, an alkyl group having 1 to 5 carbon atoms, or a phenyl group; and derivatives thereof;

e.g., thiosemicarbazide, 4-phenylthiosemicarbazide, dithizone, thiocarbazide;

thiocarbamic acids such as diethyldithiocarbamic acid and the derivatives thereof, e.g., dithiocarbamic acids as represented by the following formula:

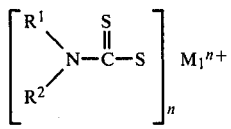

wherein

R[1] and R[2] each is a hydrogen atom, an alkyl group having 1 to 5 carbon atoms, an aralkyl group having 7 to 9 carbon atoms, or a phenyl group; $M_1$ is a hydrogen atom or an n valent metal ion; and $n = 1$ to 2;

e.g., sodium diethyl dithiocarbamate, silver diethyl dithiocarbamate, zinc dibenzyl dithiocarbamate;

and thiobenzophenones and the derivatives thereof, e.g., thiobenzophenones as represented by the following formula:

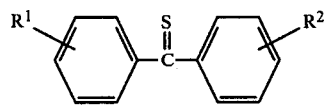

wherein

R[1] and R[2] each is a hydrogen atom, an alkyl group having 1 to 5 carbon atoms, an alkoxy group having 1 to 5 carbon atoms, an amino group substituted with two alkyl groups which may each have 1 to 5 carbon atoms, Cl, Br, or I;

e.g., N,N,N',N'-tetramethyl-4,4'-diaminothiobenzophenone (thio Michler's ketone);

Still other organic compounds which can be advantageously employed in this first embodiment of the recording material of the present invention are nitrogen- or sulfur-containing heterocyclic compounds with specific examples including imidazoles and the derivatives thereof such as imidazole and benzimidazole, imidazole and benzimidazole substituted with an alkyl group having 1 to 20 carbon atoms, an alkylamido group having 2 to 21 carbon atoms, and/or a phenyl group, e.g., imidazole, benzimidazole, 2-mercaptoimidazole, 2-mercaptobenzimidazole, 2-mercapto-5-lauroamidobenzimidazole, 2-undecyl-3-phenyl-4-mercaptoimidazole, 1-phenyl-2-mercaptoimidazole, etc., triazoles and the derivatives thereof such as triazole and benzotriazole, triazole and benzotriazole substituted with one or two alkyl groups having 1 to 20 carbon atoms, a phenyl group and/or a phenyl group substituted with an alkylamido group having 2 to 20 cabon atoms, e.g., triazole, benzotriazole, 2-mercapto-1,2,4-triazole, N-mercaptobenzotriazole, 3,4-dimethyl-5-mercapto-1,2,4-triazole, 3-methyl-4-phenyl-5-mercaptotriazole, 3-mercapto-4-phenyl-1,2,4-triazole, 3-p-caproamidophenyl-4-ethyl-5-mercapto-1,2,4-triazole, 3-n-undecyl-4-phenyl-5-mercapto-1,2,4-triazole, 1,5-dimercapto-3,7-diphenyl-[1,2,4]-triazolo-[1,2-a][1,2,4]triazole, etc.; tetrazoles and the derivatives thereof such as tetrazole, tetrazole substituted with one or two alkyl groups having 1 to 5 carbon atoms, a phenyl group, a phenyl group substituted with a benzamido group and/or an alkylamido group having 2 to 21 carbon atoms, e.g., tetrazole, 5-mercaptotetrazole, 1-phenyl-5-mercaptotetrazole, 1-(m-caproamidophenyl)-5-mercaptotetrazole, 1-(m-lauroamidophenyl)-5-mercaptotetrazole, 1-(m-benzamidophenyl)-5-mercaptotetrazole; and benzothiazoles and the derivatives thereof such as benzothiazole, benzothiazole substituted with an alkyl group having 1 to 5 carbon atoms, an acetylthioacetamido group, an -NH₂ group and/or an -SH group, e.g., benzothiazole, 2-aminobenzothiazole, 2-[α-(acetylthio)acetamido]-benzothiazole, 2-mercaptobenzothiazole, 2-mercapto-6-methylbenzothiazole, etc.

Another type of preferred organic compounds which can be employed in the present invention are macromolecular compounds with specific examples including polymethacrylic acid, polystyrene, polyamides (e.g., nylons), polyvinyl alcohol, polyethyleneoxide, methyl cellulose, polyvinyl butyral, polymethylmethacrylate, polyisobutylmethacrylate, polyethylene, rosin and so on. Furthermore, dyes and pigments can also be advantageously used as organic compounds in this first embodiment of the recording material of the present invention. Specific examples of suitable dyes include the dyes listed below.

[The CI number in the description below indicates the identification number of the *Color Index*, 3rd Ed., The Society of Dyers and Colorists, Bradford, Yorkshire (1971).]

(1) Azo dyes (those containing an —N═N— group)

(a) Acid dyes;

e.g.,

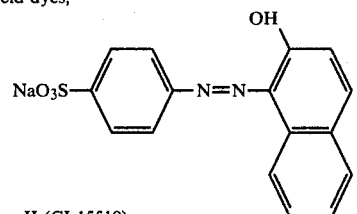

Orange II (CI 15510)

(b) Acid mordant dyes;

e.g.,

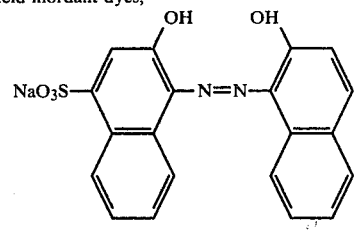

Chromium Blue Black RC (CI 15705)

-continued
(c) Direct dyes;
e.g.,
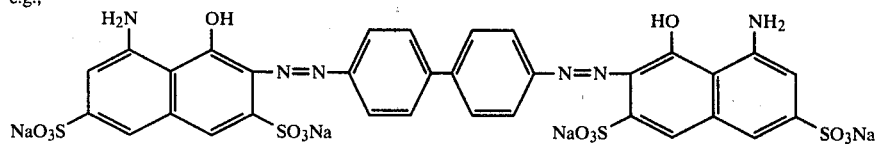
Direct Blue BB (CI 22610)
(d) Metal complex salt dyes;
e.g.,
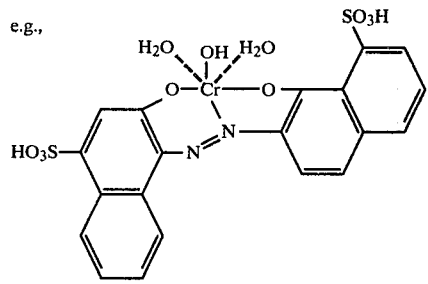
Palatine Fast Blue GGN (CI 14880)
(e) Basic dyes;
e.g.,
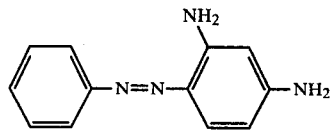
Chrysoidine (CI 11270)
(f) Acetate dyes;
e.g.,
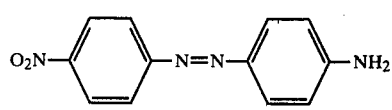
(g) Azoic dyes;
(i) Fast color bases;
e.g.,
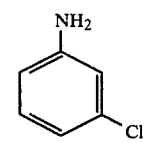
Fast Orange G Base (CI 37005)
(ii) Fast color salts;
e.g.,
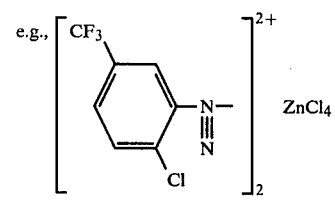
Fast Orange Salt RD (CI 37050)

(iii) Naphthols;
e.g.,
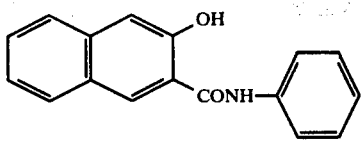
Naphthol AS (CI 37505)
(iv) Rapid fast dyes;
e.g.,
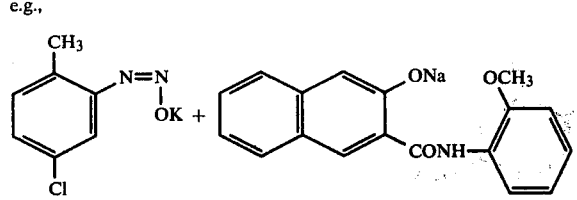
Rapid Fast Scarlet RH (CI 469)
(v) Rapidogen dyes;
e.g.,
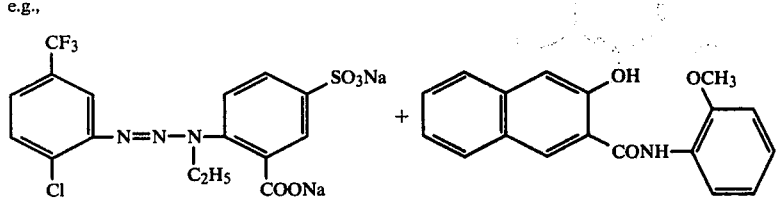
(h) Pyrazolone dyes (those containing 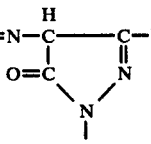);
e.g.,
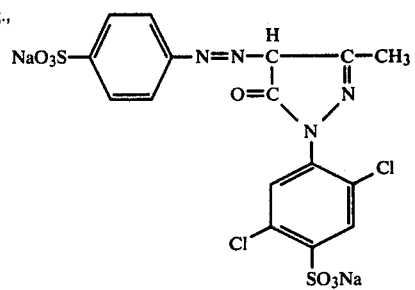
Xylene Fast Yellow 2 G (CI 18965)
(i) Stilbene dyes (those containing
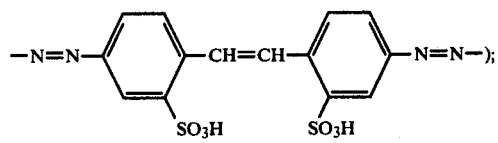

e.g.,
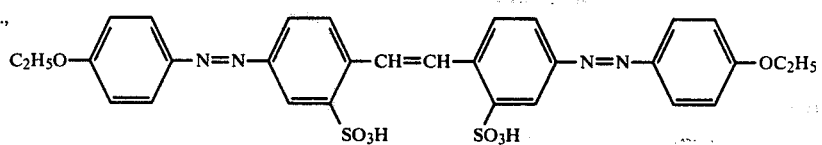
Chrysophenine G (CI 24895)
(j) Thiazole dyes (those containing
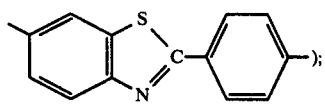);
e.g.,
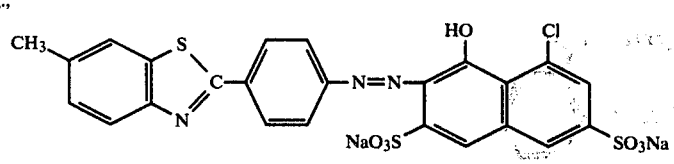
Diaminrosa BD (CI 15075)
(2) Anthraquinone dyes (those containing 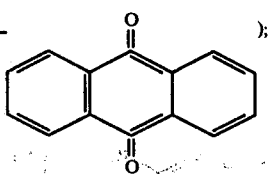);
(a) Mordant dyes;
e.g.,
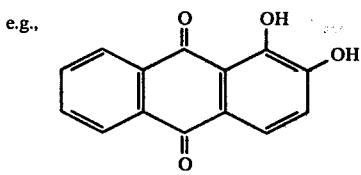
Alizarin (CI 58000)
(b) Acid mordant dyes;
e.g.,
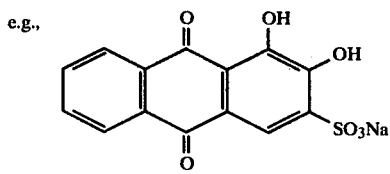
Alizarin Red S (CI 58005)
(c) Acid dyes;
e.g.,
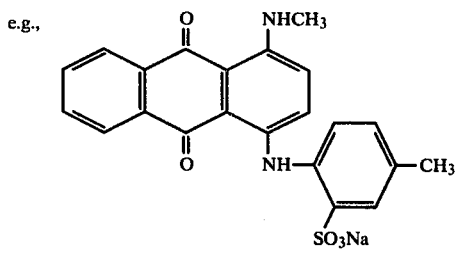
Alizarin Astral B (CI 61530)

(d) Acetate dyes;
e.g., 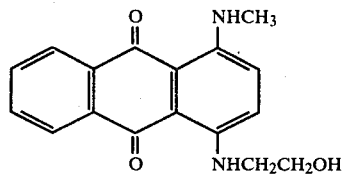
Celliton Fast Blue FER (CI 61505)
(e) Vat dyeing dyes
(i) Anthraquinone type;
e.g., 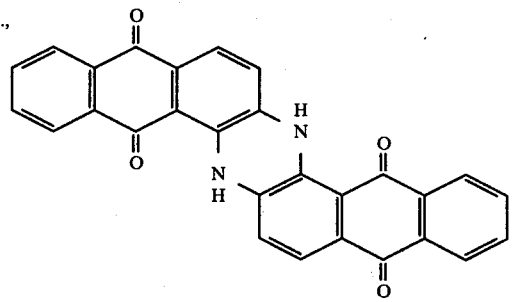
Indanthrene Blue RSN (CI 69800)
(ii) Anthrone type dyes;
e.g., 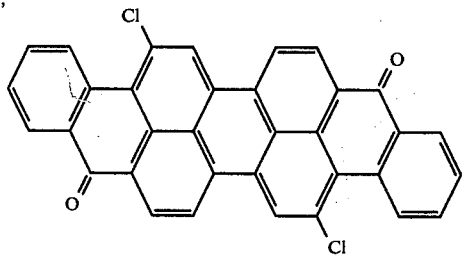
(CI 60010)
(3) Indigoid dyes (those containing 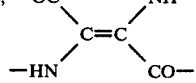);
(a) Indigoids; 
$$\begin{array}{c} -OC \\ -HN \end{array} C=C \begin{array}{c} NH- \\ CO- \end{array}$$
for example,
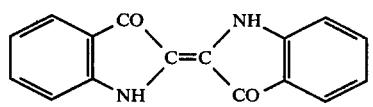
Indigo (CI 73000)

(b) Thioindigoids; 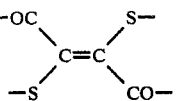
for example,
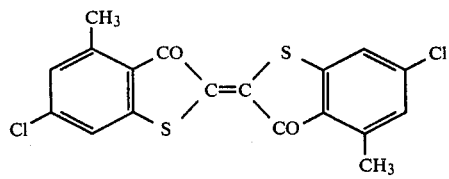
(CI 73385)
(4) Soluble vat dyeing dyes
(a) Indigoids;
e.g.,
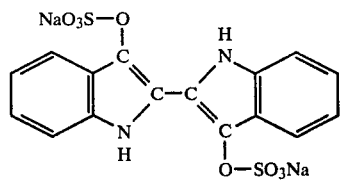
Indigodol 0 (CI 73002)
(b) Anthraquinoids;
e.g.,
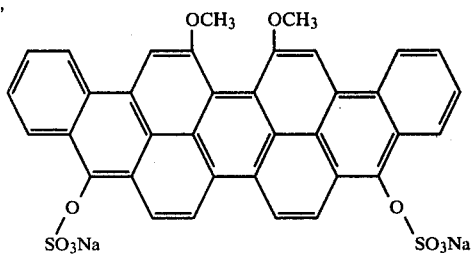
Anthrasol Green IB (CI 59826)
(5) Sulfur dyes;
e.g.,
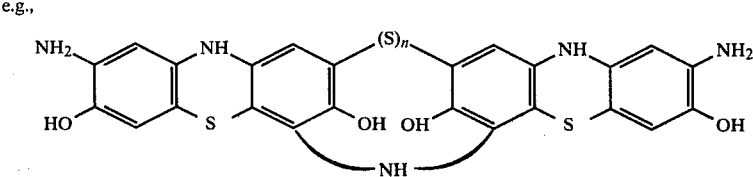
(CI 53185)
(6) Carbonium dyes (those containing $-\overset{\|}{\underset{\|}{C}}-$);

-continued
(a) Diphenylmethane dyes (those containing
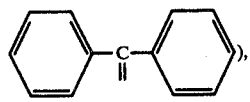
e.g.,
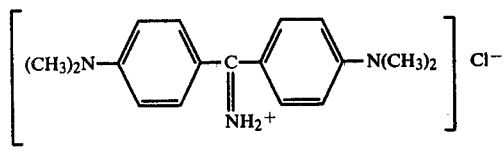
Auramine
(b) Triphenylmethane dyes (those containing
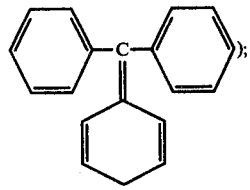
e.g.,
1.
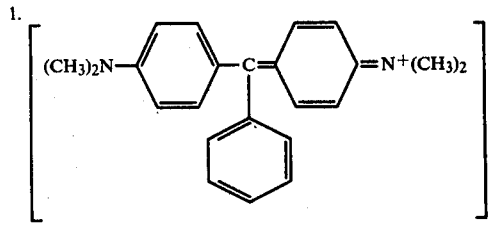
Oxalic acid salt
Malachite Green (CI 42000)
2.
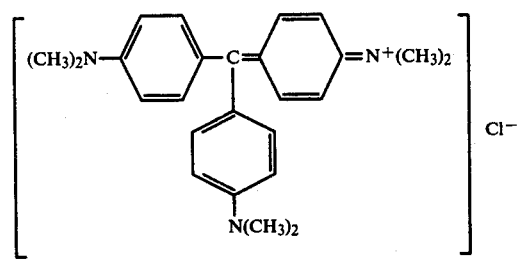
Crystal Violet (CI 42555)

(c) Xanthene dyes (those containing
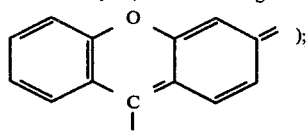
);
e.g.,
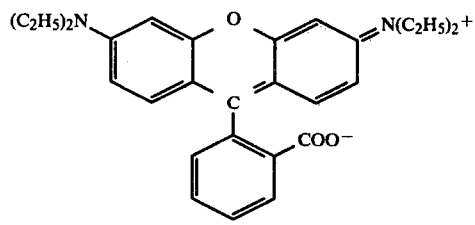
Rhodamine B (CI 45170)
(d) Acridine dyes (those containing
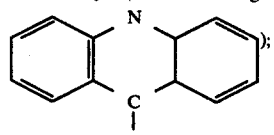
);
e.g.,
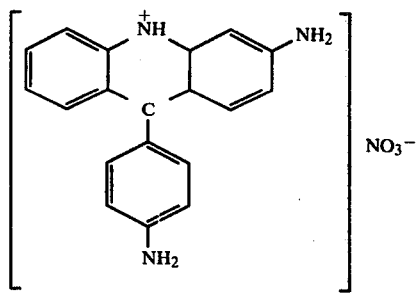
Phosphine (CI 46045)
(7) Quinoneimine dyes (those containing $\diagdown\!\!\!\!\diagup\!\!\!\!\!\mathrm{C}\!=\!\mathrm{N}\!-$ group)
(a) Azine dyes (those containing
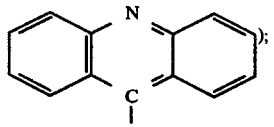
);
e.g.,
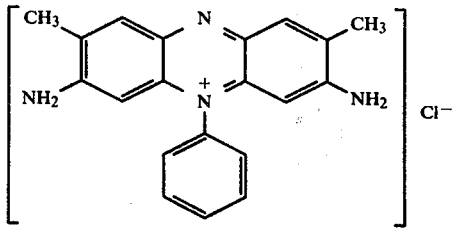
Safranine T (CI 50240)

(b) Oxazine dyes (those containing 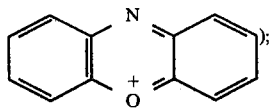);
e.g.,
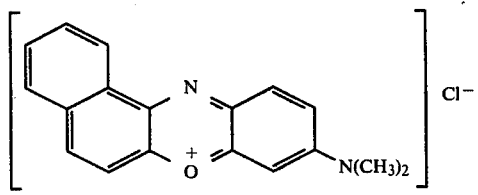
Meldora's Blue (CI 51175)
(c) Thiazine dyes (those containing 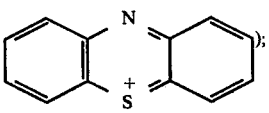);
e.g.,
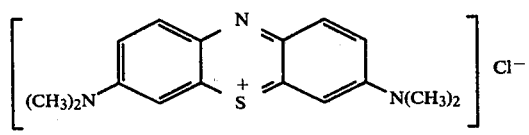
(CI 52015)
(8) Phthalocyanine dyes
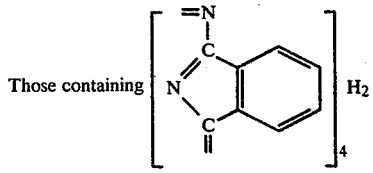
(9) Other dyes
(a) Cyanine dyes (those containing
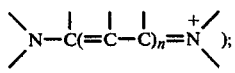);
(b) Quinoline dyes;
e.g.,
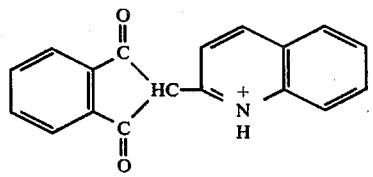
Quinoline Yellow (CI 47000)

(c) Nitro dyes;

e.g.,

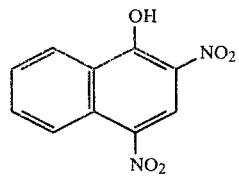

Naphthol Yellow S (d) Nitroso dyes;

e.g.,

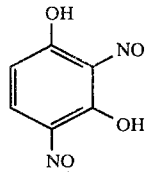

Fast Green O

Examples of suitable pigments include phthalocyanine pigments, anthraquinone pigments, quinoline pigments and so on.

The above-described organic compounds may be employed individually or as a combination thereof in this first embodiment of the recording material of the present invention. Hereinafter, these materials will be collectively described as "organic compounds of the present invention" for brevity.

The recording material of the present invention in this first embodiment has a single or a composite layer formed by evaporating one or more of the above-described organic compounds, respectively, in a layer onto a support or another layer using a vacuum deposition technique.

Figure 4:
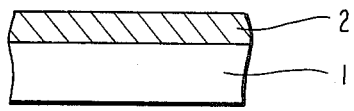

The recording material of the present invention in a second embodiment comprises a support having thereon a layer of a vacuum deposited mixture of an inorganic material and an organic compound by evaporating simultaneously both the inorganic material and the organic compound using a vacuum deposition technique. The recording material of this second embodiment of the present invention is basically illustrated as shown in FIG. 4 where 1 is a support and 2 is a layer of a vacuum deposited mixture of the inorganic material and the organic compound.

Suitable examples of organic compounds which can be used in this second embodiment of this invention are as described hereinabove for the first embodiment of this invention and suitable examples of metals and metal compounds as inorganic materials which can be used in the second embodiment of this invention are described in detail below.

To produce the layer of the mixture of the organic compound and the inorganic material employed in this second embodiment of the recording material of the present invention, a so-called vacuum co-deposition technique is preferably employed in producing such a layer. More specifically, in producing the recording material of this second embodiment of the present invention, the inorganic material and the organic compound to be deposited are placed in separate containers as evaporation sources in a vacuum deposition apparatus and each of these materials is heated in advance up to the individual temperature required for evaporation using separate heating devices installed in the container for each evaporation source. Then, the thus-heated materials are simultaneously evaporated from each of the respective containers and are deposited on the same support arranged at a prescribed position in the vacuum deposition apparatus. Two or more of each of these materials may be evaporated from the same container as an evaporation source. With either approach, an inorganic material and an organic compound are deposited on the support at the same time and therefore, the resulting vacuum deposited layer is formed with both the inorganic material and the organic compound being in a homogeneously mixed state.

Specific examples of metals and inorganic compounds which can be employed in the layers formed by the inorganic materials, in addition to the above-described organic compounds, are illustrated below.

A wide variety of metals can be employed as metals which can be effectively used in the co-deposited layer employed in this second embodiment of the present invention. For instance, metals which are disclosed in Japanese Patent Application (OPI) No. 20821/77 (corresponding to U.S. patent application Ser. No. 695,212, filed June 11, 1976) may be employed. Of these metals, Mg, Mn, Cu, Zn, Al, In, Sn and Bi are especially preferred from a practical point of view. In particular, In, Sn and Bi are preferred due to their low melting points and low light reflectances. These metals may be employed individually, as combinations thereof, or in the form of an alloy thereof.

Preferred examples of inorganic compounds which may be employed in the co-deposited layer employed in this second embodiment of the present invention include metal sulfides such as CrS, $CrS_2$, $Cr_2S_3$, $MoS_2$, FeS, $Fe_2S$, CoS, NiS, $Ni_2S$, $Cu_2S$, $Ag_2S$, ZnS, $In_2S_3$, $In_2S_2$, $GeS_x$ (wherein x is a positive real number of 2.5 or less), SnS, $SnS_2$, etc.; metal fluorides such as $MgF_2$, $CaF_2$, $RhF_3$, etc.; metal oxides such as $MoO_3$, $In_2O$, $In_2O_3$, GeO, etc.; various kinds of halides as disclosed in Japanese Patent Publication No. 158464/76, with especially advantageous examples including AgI, AgBr, AgCl, PbI$_2$, PbBr$_2$, PbCl$_2$, PbF$_2$, SnI$_2$. SnCl$_2$, CuI, CuBr, CuCl, KI, KCl and the like; and so on.

Of the above-described inorganic materials, metals are preferred as an additional layer in the first embodiment of the invention or in the co-deposited layer in the second embodiment of this invention for the purpose of increasing the optical density of the recording layer. Additionally, to further increase the recording sensitivity the above-described metals and inorganic compounds are preferably both present as an additional layer(s) in the first embodiment of this invention or both in the co-deposited layer in the second embodiment of this invention. In general, these metals and inorganic compounds when provided as additional layers as described in detail below are provided in a layer form prepared by vacuum deposition, but the layer(s) of such materials may be formed using other known techniques, if desired.

A wide variety of additional different constructions as to the constituent layers present can be used. These additional layer constructions are illustrated in detail hereinafter.

Constructions wherein one or more additional layers comprising an inorganic material such as a metal or other analogous materials for the purpose of increasing the optical density and one or more additional layers comprising an inorganic material such as various kinds of inorganic compounds or other analogous materials for the purpose of increasing the absorption of light (decreasing reflectance of light) are superposed upon one another are preferred. In particular, recording materials prepared by vacuum depositing the organic compounds described above or co-vacuum depositing a mixture of the organic compounds described above and an inorganic material as described above in a layer form onto a recording material having inorganic material layers such as metal layers, inorganic compound layers and the like layers possess high sensitivity.

Preferred embodiments of layer constructions of the recording materials of the present invention are illustrated below. FIGS. 1 to 4 are diagrammatic cross-sections of various layer constructions of the embodiments of the recording materials of the present invention. The thickness of each layer shown in each diagram, however, does not imply a relative thickness relationship among the layers present. Rather the layers are pictured schematically merely for the purposes of illustration. In the figures, layer 1 is a support, layer 2 is a vacuum deposited layer of at least one organic compound or a vacuum co-deposited layer of a mixture of at least one organic compound and at least one inorganic material, and layer 3 is a metal layer, an inorganic compound layer, a layer containing both a metal and an inorganic compound, or a composite layer obtained by superimposing some of these layers on one another.

FIG. 1 is a schematic cross section diagram of one layer construction of a recording material of this invention, which has on a support 1 in sequence a layer 2 of an organic compound or of a mixture of an organic compound and an inorganic material and a layer 3 of an inorganic material such as a metal or an inorganic compound.

Figure 2:
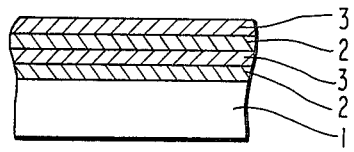

FIG. 2 is a schematic cross section diagram of another layer construction of the recording material of this invention, which has on a support 1 a plurality of layers 2 of an organic compound or a mixture of an organic compound and an inorganic material and one or more layers 3 of inorganic materials such as layers of a metal or an inorganic compound.

Figure 3:
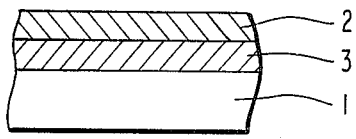

FIG. 3 is a schematic cross section diagram of still another layer construction of the recording material of this invention, which has on a support 1 in sequence a layer 3 of an inorganic material such as a layer of a metal or an inorganic compound, and a layer 2 of an organic compound or of a mixture of an organic compound and an inorganic material.

FIG. 4 is a schematic cross section diagram of the basic layer construction of the recording material of this invention, which has on a support 1 a layer 2 of an organic compound or of a mixture of an organic compound and an inorganic material.

In each of these layer constructions, optionally, an appropriate interlayer may be provided on support 1 for the purpose of heat insulation or to prevent delamination of a layer provided on the support, using appropriate techniques such as coating, evaporation or the like. In particular, when a metal layer is provided closest to the support using a evaporation technique, it is desirable to provide an interlayer as described above. In addition, a protective layer of a known material, e.g., in a thickness of about 0.1 to 10$\mu$, may optionally be provided on the top of each of the above-described recording materials.

The thickness of each of the layers of this first embodiment of the present invention can be varied over a wide range depending upon the purpose of end-use of the recording material obtained. In general, a suitable thickness of a layer formed by vacuum evaporation of the organic compounds described above onto another layer present ranges from about 10 Å to about 10,000 Å. Especially good results are obtained when the thickness of such an organic compound layer ranges from 50 Å to 5,000 Å. On the other hand, when two or more organic compound layers are provided, the total thickness of each of the organic compound layers together is preferably within the above-described range. However, the optimum thickness of the organic compound layer is selected depending upon the kind of the organic compound used and the configuration of the layers employed. The thickness of the metal layer or the layer of an inorganic compound additionally can likewise be varied over a wide range depending upon the purpose of end-use of this first embodiment of the recording material obtained, the characteristics of materials employed and the kind of materials used in combination. In general, a suitable total thickness is about 200 Å to about 1,500 Å when two or more such layers are present. While not limiting, generally the thickness of the metal layer is about 200 Å to about 1,200 Å and the thickness of the inorganic compound layer is about 50 Å to about 1,000 Å.

In addition, as far as is known, no correlation exists in this embodiment between the thickness of the organic compound layer and that of the metal or the inorganic compound layer. The thickness of the layer of the metal or the inorganic compound is related particularly to the optical density of the recording layer, but the thickness of the layer of the organic compound can be selected independently of the thickness of the metal layer or the inorganic compound layer.

The recording materials of this first embodiment of the present invention have higher sensitivity than those which do not have an organic compound layer present, although the reason for this higher sensitivity is not completely clear at the present time. While not desiring to be bound, it can be postulated that the meltability due to the low melting point inherent in organic compounds, and the capability of the shape of the organic compound to vary readily from a flat layer to small spheres through fusion are responsible for the improved sensitivity. Further, it may be that the organic compound layer produced by vacuum deposition has poor adhesion to the support or other layers and, because of this poor adhesion, the recording layer can be easily deformed, in other words, the poor adhesion contributes to the high-sensitivity of the recording material. Furthermore, it is difficult to obtain an organic compound layer which is both uniform and thin by coating, and the thus obtained layer using coating tends to be non-uniform internally due to crystallization of the organic compound. This results in irregular sensitivity from position to position of the recording layer. On the other hand, the organic compound layer as used in this first embodiment of this invention produced by vacuum deposition is both uniform and thin.

Preferred layer constructions of this first embodiment of the recording material of the present invention are, in general, represented by the layer constructions depicted in FIGS. 1 and 2. When the organic compound layer provided acts as an anti-halation layer, the layer constructions of this first embodiment of the recording material of this invention may be represented by the layer constructions depicted in FIGS. 3 and 4. When the optical density contrast of the recording layer is obtained merely using dyes, pigments or colored organic compounds in the present invention, the recording material of this first embodiment of this invention is represented by the layer construction illustrated in FIG. 4. However, the organic compound layer of this first embodiment of the present invention should not be construed as being provided for the purpose of simply a decrease in reflectance.

An advantage of both of the embodiments of the present invention described above is that the number of steps necessary to prepare the recording material of this invention can be reduced because the recording layer of the present invention may, in general, be produced simply by evaporating sequentially certain materials to form a recording layer, a mixed composite recording layer or deposition in a multi-layer form and therefore, a conventional continuous evaporation apparatus can be employed.

It is to be emphasized that the recording materials of this invention can be used as reflection type image recording materials and as transmission type image recording materials by an appropriate choice of the support used, the recording layer thickness, the color of the recording layer or layers on the support or the opacity of the recording layer or layers on the support to transmitted light when the recording material is viewed after image recordation therein. Basically all that is needed for image recordation is that the recording layers in relation to the support used provide a difference which is discernible optically between the radiation exposed areas and the non-exposed areas. For example where the support is transparent, e.g., a synthetic resin film, and such has thereon the organic compound layer as described in the first embodiment of this invention as shown in FIG. 4, the organic compound used in the organic compound layer must be either colored per se (i.e. non-transparent) or must have a dye or pigment added thereto to provide contrast between the radiation exposed areas and the non-exposed areas after image recordation. Further, where the support is a white opaque support such as a paper support and such has thereon the organic compound layer as described in the first embodiment of this invention as shown in FIG. 4, is white or similarly only slightly colored the organic compound layer must be of an organic compound which is per se colored or has a dye or pigment added thereto to provide sufficient contrast between the radiation exposed areas and the non-exposed areas after image recordation. Where a vacuum co-deposited layer of a mixture of an organic compound and an inorganic material is used as in the second embodiment of this invention or when an additional layer or layers of an inorganic material are additionally present in the recording material as shown in FIGS. 1 to 3, sufficient contrast between the radiation exposed areas and the non-exposed areas generally is obtained and less concern exists as to the color or opacity of the organic compound used in the recording layer.

The rate of mixing and the thickness of the co-deposited layer of the mixture of the organic compound and the inorganic material in the second embodiment of this invention can be controlled as desired depending upon the purpose of end use. A preferred mixing ratio by volume of the organic compound to the inorganic material in this second embodiment preferably ranges from about 0.1:1 to 10:1 and particularly, from 0.5:1 to 5:1, this ratio being based on the thickness of a deposited layer prepared from the organic compound alone to the thickness of a deposited layer prepared from the inorganic material alone. In general, a suitable thickness of the recording layer used in this second embodiment of the recording material of the present invention ranges from about 200 Å to about 1,500 Å, and the thickness can be selected depending upon the optical and other physical characteristics, or on the chemical characteristics of materials to be vacuum evaporated and deposited, and the purpose of end use of the recording materials obtained. For instance, in order to achieve an optical density of 2.0, a thickness ranging from about 300 Å to about 1,000 Å is required, although this will depend upon the kind of inorganic material employed and the condition of the layer formed. However, a preferred thickness of the deposited layer used in this second embodiment of the present invention preferably ranges from 50 Å to 5,000 Å from a practical point of view.

As described above, in this second embodiment, one or more metals alone can be employed as the inorganic material; one or more inorganic compounds alone can be employed as the inorganic material; and a combination of one or more metals and one or more inorganic compounds together can be employed as the inorganic material. Which of the above is used depends upon the purpose of end use. For instance, a combination of one or more metals and one or more inorganic compounds can be employed to achieve high optical density and high recording sensitivity. Of the above-described inorganic materials, metals are preferred for the purpose of increasing the optical density of the recording layer. However, the co-presence of the metals with the above-described inorganic compounds results in the sensitivity being further enhanced. On the other hand, where a comparatively low optical density in the recording layer is appropriate for the end use desired, metals do not have to be used as the inorganic material.

Although the recording material of this second embodiment of the present invention mainly includes the recording layer of the mixture of the inorganic material and the organic compound as described above, an appropriate interlayer may be optionally provided between the support and the recording layer for the purpose of heat insulation or to prevent delamination using an appropriate technique such as coating, vacuum deposition or the like. In addition, a protective layer, an antihalation layer and/or a light absorbing layer may be optionally provided on the layer of the mixture of the inorganic material and the organic compound. Additional layers as described for the first embodiment can also be present.

In accordance with this second embodiment of the present invention, it has been found that the recording material including a layer of a mixture of metals or inorganic compounds with organic compounds has reduced light reflectance and therefore, the light employed for exposure can be absorbed by the recording layer with high efficiency. In addition, the organic compounds present in the recording layer can prevent most of the heat supplied by the radiation in the areas exposed to radiation from escaping due to the low heat conductivity of organic compounds and consequently, the heat absorbed by the recording layer can be effectively utilized for the thermal deformation of the recording material in the exposed areas. This effect due to the presence of the organic compounds might be predicted since the recording sensitivity of a recording layer of a mixture of metals and inorganic compounds, which has lower reflectance, is almost the same as that of a recording layer of a mixture of metals and organic compounds, which has higher reflectance. Further, the recording layer material in the thermally deformed areas can easily condense in a form of clusters of small spheres or globules due to the presence of the organic compounds and therefore, this effect also can contribute to the increase in recording sensitivity. The production of these small spheres or globules can be confirmed by microscopic examination of traces recorded by radiation exposure on the layer of the mixture. Moreover, the resulting recorded traces form sharp boundaries between the exposed and non-exposed areas, so images having high resolution can be obtained. Furthermore, when the organic compounds employed are highly adhesive to the support used and have excellent mechanical strength, the recording layer can be provided directly on a support using a vacuum deposition technique without use of an interlayer on the support and further, it is not necessary to provide a protective layer on the recording layer. For example, simply a layer of a mixture of Sn, PbI and pyromellitic acid provided on a support by evaporating simultaneously Sn, PbI and pyromellitic acid to form a codeposited single layer on the support is suitable for practical use.

The present invention is illustrated in greater detail by reference to the following examples. Unless otherwise indicated herein, all parts, percents, ratios and the like are by weight.

EXAMPLE 1

Each of the various organic compounds set forth in Table 1 below was evaporated to deposit in a layer on a polyethylene terephthalate support having a thickness 100 microns using vacuum deposition (the pressure in vacuum chamber: $5 \times 10^{-5}$ Torr). Sn or Bi was provided on the resulting organic material layer as a metal layer and further, GeS or SnS was also provided on the resulting metal layer as an inorganic layer using vacuum deposition. In this case, the recording material obtained had the construction as depicted in FIG. 1, with layer 3 representing a double layer of a metal layer and an inorganic layer. The thickness of each of the layers present is also set forth in Table 1. Each of the thus obtained recording materials having the above-described layers was scanned with argon ion laser light (having a wavelength of 5145 Å) which was concentrated into a spot having a diameter of 25 nm, with a scanning rate of 19 m/sec. Thermal deformation was produced in the areas exposed to the laser light causing a decrease in the transmittance in the exposed areas. Thus, an image was formed. The intensity of the minimum output of the laser light required for forming an image (called the "threshold value" hereinafter) was determined for each of recording materials prepared. The relative sensitivity of each of the recording materials was evaluated using the threshold value.

TABLE 1

| Sample No. | Organic Compound Layer | | Metal Layer | SnS Inorganic Layer | Threshold Value (mW) |
|---|---|---|---|---|---|
| | Organic Compound | Thickness (Å) | Thickness (Å) | Thickness (Å) | |
| 1-1 | None | 0 | Sn 300 | SnS 300 | 250 |
| 1-2 | Pyromellitic Acid | 1500 | Sn 300 | SnS 300 | 135 |
| 1-3 | Maleic Acid | 1500 | Sn 300 | SnS 300 | 200 |
| 1-4 | Coumarinic Acid | 1500 | Sn 300 | SnS 300 | 160 |
| 1-5 | 4-Hydroxy-6-methyl-1,3,3a,7-tetraazaindene | 1500 | Sn 300 | SnS 300 | 200 |
| 1-6 | Anisic Acid | 200 | Sn 300 | SnS 300 | 200 |
| 1-7 | Phthalic Anhydride | 150 | Sn 300 | SnS 300 | 200 |
| 1-8 | None | 0 | Sn 300 | GeS 300 | 150 |
| 1-9 | Fumaric Acid | 200 | Sn 300 | GeS 300 | 125 |
| 1-10 | 3-Iodobenzanthrone | 1600 | Sn 300 | GeS 300 | 125 |
| 1-11 | 2-Mercapto-5-lauroylimidazole | 1600 | Sn 300 | GeS 300 | 100 |
| 1-12 | 2-Mercapto-5-lauroylimidazole | 200 | Sn 300 | GeS 300 | 125 |
| 1-13 | None | 0 | Bi 300 | GeS 300 | 225 |
| 1-14 | Palmitic Acid | 1600 | Bi 300 | GeS 300 | 100 |
| 1-15 | Palmitic Acid | 200 | Bi 300 | GeS 300 | 100 |

It is apparent from the results in Table 1 that recording materials with an organic compound layer have smaller threshold values, compared with recording materials which do not have any organic material layer (which correspond to Sample Numbers 1-1, 1-8 and 1-13).

EXAMPLE 2

Fumaric acid was evaporated and a layer thereof was deposited on a polyetylene terephthalate film support having a thickness of 100 microns using vacuum deposition and further, Sn and GeS, or Sn and SnS were simultaneously evaporated and a layer thereof was deposited on the resulting fumaric acid layer. Thus, an organic compound layer and a layer of a mixture of the metal and the inorganic compound were sequentially provided on the support. Furthermore, a protective layer having the following composition was provided on the metal-inorganic sulfide mixture layer at a dry coverage of 0.5 micron.

| Composition of Protective Layer | |
| --- | --- |
| Chlorinated Polyethylene (degree of chlorination: 60 wt % or more) | 1.0 g |
| Triphenyl Phosphate | 0.125 g |
| Stearic Acid | 0.050 g |
| Toluene | 100 g |

Each of the thus obtained recording materials was scanned with argon ion laser light in the same manner as in Example 1, and an image was recorded therein. The intensity of the laser light required for each recording material was determined, and compared with the intensity required where the organic compound layer was not present. The results obtained are shown in Table 2 below.

TABLE 2

| Sample No. | Organic Compound Layer | | Metal-Inorganic Compound Layer | Protective Layer | Threshold Value (mW) |
| --- | --- | --- | --- | --- | --- |
| | Organic Compound | Thickness (Å) | Thickness (Å) | | |
| 2-1 | Absent | 0 | Sn(400)-GeS(400) | Absent | 225 |
| 2-2 | Fumaric Acid | 300 | Sn(400)-GeS(400) | Absent | 175 |
| 2-3 | Absent | 0 | Sn(400)-SnS(400) | Absent | 250 |
| 2-4 | Fumaric Acid | 300 | Sn(400)-SnS(400) | Absent | 200 |
| 2-5 | Absent | 0 | Sn(400)-GeS(400) | Present | 275 |
| 2-6 | Fumaric Acid | 300 | Sn(400)-GeS(400) | Present | 225 |
| 2-7 | Absent | 0 | Sn(400)-SnS(400) | Present | 300 |
| 2-8 | Fumaric Acid | 300 | Sn(400)-SnS(400) | Present | 250 |

The results in Table 2 show recording could be achieved with the intensity of the minimum output of the laser light reduced by 50 mW for recording materials of this invention in comparison with recording materials which did not have an organic compound layer.

EXAMPLE 3

Samples of recording materials were prepared in the same manner as in Example 2 except that four other organic compounds were employed instead of fumaric acid. The results obtained are shown in Table 3.

TABLE 3

| Sample No. | Organic Compound Layer | | Metal-Inorganic Compound Layer | Protective Layer | Threshold Value (mW) |
| --- | --- | --- | --- | --- | --- |
| | Organic Compound | Thickness (Å) | Thickness (Å) | | |
| 3-1 | Absent | 0 | Sn(300)-GeS(300) | Absent | 200 |
| 3-2 | Thiourea | 300 | Sn(300)-GeS(300) | Absent | 125 |
| 3-3 | 2-Mercapto-5-lauramidobenzimidazole | 300 | Sn(300)-GeS(300) | Absent | 125 |
| 3-4 | p-Ethylbenzenesulfonic Acid | 300 | Sn(300)-GeS(300) | Absent | 150 |
| 3-5 | Quinacridone | 300 | Sn(300)-GeS(300) | Absent | 125 |

It is apparent from the results in Table 3 that recording materials having organic compound layers possess distinctly higher sensitivity than those which do not have an organic compound layer present.

EXAMPLE 4

A metal (as an inorganic material) and an organic compound, as set forth in Table 4 below, were simultaneously evaporated to form a codeposited layer on a polyethylene terephthalate support having a thickness of 100 microns. The thickness indicated in Table 4 corresponds to the thickness of the deposited layer prepared from only one constituent material. The vacuum deposition was carried out by placing the metal and the organic compound in individual containers as evaporation sources placed at separate positions in a vacuum deposition apparatus where the pressure inside the apparatus was maintained at $5 \times 10^{-5}$ Torr; the evaporation source materials were heated with the shutters over the source containers closed in order not to contaminate in advance the support, and their respective temperature conditions for attaining the respectively desired constant evaporation rate were established using monitoring devices installed in the individual evaporation sources. Then both shutters were opened at the same time, and the metal and the organic compound both were codeposited on the support with the individual rates of evaporation previously determined. The transmittance of each of the thus prepared samples of recording materials was determined and is shown in Table 4 below. Each of the recording materials thus obtained was scanned with argon ion laser light (having a wavelength of 5154 Å), which was concentrated into a spot having a diameter of 25 nm, with a scanning rate of 19 m/sec. Thermal deformation was produced in the areas exposed to the laser light to cause a decrease in the transmittance in the exposed areas to occur. Thus recording was accomplished. The "threshold value" of the laser light as described in Example 1 was determined for each of the recording materials prepared, and thereby, the relative sensitivity of each of the recording materials was evaluated.

below. The recording was also carried out in the same manner as in Example 4.

TABLE 5

| Sample No. | Codeposited Layer | | | | Trans-mittance | Threshold Value (mW) |
|---|---|---|---|---|---|---|
| | Inorganic Material | Thickness (Å) | Organic Compound | Thickness (Å) | | |
| 5-1 | SnS | 530 | Fumaric Acid | 1040 | 0.22 | 250 |
| 5-2 | SnS | 760 | Fumaric Acid | 1530 | 0.22 | 250 |
| 5-3 | SnS | 1040 | Fumaric Acid | 1040 | 0.43 | 250 |
| 5-4 | SnS | 1500 | Fumaric Acid | 1540 | 0.66 | 300 |
| 5-5 | SnS | 2000 | Fumaric Acid | 1080 | 0.70 | 300 |
| 5-6 | SnS | 1000 | Rosin | 700 | 0.86 | 400 |
| 5-7 | SnS | 1000 | Rosin | 490 | 1.58 | 400 |
| 5-8 | SnS | 500 | None | 0 | 0.60 | 400 |

TABLE 4

| Sample No. | Codeposited Layer | | | | Trans-mittance | Threshold Value (mW) |
|---|---|---|---|---|---|---|
| | Inorganic Material | Thickness (Å) | Organic Compound | Thickness (Å) | | |
| 4-1 | In | 500 | Sebasic Acid | 1900 | 1.35 | 150 |
| 4-2 | In | 550 | Sebasic Acid | 1700 | 2.05 | 175 |
| 4-3 | Sn | 500 | Pyromellitic Anhydride | 1000 | 1.35 | 200 |
| 4-4 | Sn | 400 | Sebasic Acid | 800 | 1.20 | 200 |
| 4-5 | Sn | 400 | Thiourea | 400 | 1.32 | 175 |
| 4-6 | Sn | 400 | 2-Mercapto-5-lauramidobenz-imidazole | 400 | 1.41 | 150 |
| 4-7 | Sn | 400 | p-Ethylbenzene-sulfonic Acid | 400 | 1.31 | 200 |
| 4-8 | Sn | 400 | Quinacridone | 400 | 2.00 | 125 |
| 4-9 | Sn | 400 | Tetraiodo-fluorescein | 1400 | 1.45 | 200 |
| 4-10 | Sn | 430 | Erithrosine | 110 | 3.20 | 175 |
| 4-11 | Sn | 400 | None | 0 | — | 425 |
| 4-12 | Sn | 600 | 3-Iodobenz-anthrone | 200 | — | 175 |
| 4-13 | Sn | 600 | 3-Iodobenz-anthrone | 300 | — | 200 |
| 4-14 | Sn | 600 | 3-Iodobenz-anthrone | 400 | — | 200 |
| 4-15 | Sn | 600 | 3-Iodobenz-anthrone | 600 | — | 200 |
| 4-16 | Sn | 600 | None | 0 | — | 450 |

(— Not measured)

The results in Table 4 above show that recording materials of the present invention have smaller threshold values than the recording materials (Sample Nos. 4-11 and 4-16), each of which only had a single layer of Sn, by a factor of ½. Accordingly, a two- or more-fold increase in sensitivity can be achieved with the recording material of the present invention.

EXAMPLE 5

An inorganic compound (as an inorganic material) and an organic compound, as set forth in Table 5 below, were codeposited in the same manner as in Example 4 to obtain a recording material. The materials evaporated to form the recording layer of each of the samples, the thickness of each of the recording layers, the transmittance and the threshold value of the laser light required for recording in each material are shown in Table 5

It can be clearly seen from the above results that a recording material having therein an organic compound codeposited with an inorganic material has high sensitivity, e.g., compare Sample No. 5-1 with Sample No. 5-8 where both samples have almost the same amounts of the inorganic material.

EXAMPLE 6

Both a metal and an inorganic compound (as an inorganic material), and an organic compound were codeposited using three separate evaporation sources in the same manner as in Example 4 to obtain a recording material. Recording also was carried out in the same manner as in Example 4. The materials evaporated to form the recording layer of each of the samples, the thickness of each of the recording layers, the transmittance thereof and the threshold value thereof are shown in Table 6 below.

TABLE 6

| Sample No. | Codeposited Layer | | Transmittance | Threshold Value (mW) |
|---|---|---|---|---|
| | Inorganic Material Thickness (Å) | Organic Compound Thickness (Å) | | |
| 6-1 | Sn(400)-SnS(150) | Fumaric Acid (150) | 2.3 | 125 |
| 6-2 | Sn(400)-GeS(200) | Pyromellitic Acid (100) | 2.1 | 125 |
| 6-3 | Sn(400)-SnS(150) | None | 2.4 | 350 |

TABLE 6-continued

| | Codeposited Layer | | | |
|---|---|---|---|---|
| Sample No. | Inorganic Material Thickness (Å) | Organic Compound Thickness (Å) | Transmittance | Threshold Value (mW) |
| 6-4 | Sn(400)-GeS(200) | None | 2.4 | 350 |

As in Examples 4 and 5, the recording materials of the present invention have a markedly increased sensitivity.

While the invention has been described in detail and with reference to specific embodiments thereof, it will be apparent to one skilled in the art that various changes and modifications can be made therein without departing from the spirit and scope thereof.

What is claimed is:

1. A thermal recording material comprising a support having in sequence thereon a recording layer thermally deformable through exposure to high intensity radiation and a layer of one or more metals, a layer of one or more inorganic compounds or a layer of a mixture of said one or more metals and said one or more inorganic compounds on said recording layer, the recording layer comprising a vacuum deposited layer of at least one organic compound selected from a group consisting of organic carboxylic acids, salts of organic carboxylic acids, esters of organic carboxylic acids, aromatic sulfonic acids, organic acylic sulfur compounds, nitrogen-containing heterocyclic compounds, sulfur-containing heterocyclic compounds, organic macromolecular compounds selected from the group consisting of polymethacrylic acid, polystyrene, polyamides, polyvinyl alcohol, polyethyleneoxide, methyl cellulose, polyvinyl butyral, polymethylmethacrylate, polyisobutylmethacrylate, polyethylene and rosin, dyes selected from the group consisting of azo dyes, anthraquinone dyes, indigoid dyes, soluble vat dyeing dyes, sulfur dyes, carbonium dyes, quinoneimine dyes, phthalocyanine dyes, cyanine dyes, quinoline dyes, nitro dyes and nitroso dyes and pigments selected from the group consisting of phthalocyanine pigments, anthraquinone pigments, and quinoline pigments, wherein said metal is magnesium, manganese, copper, zinc, aluminum, indium, tin or bismuth and said inorganic compound is a metal sulfide selected from the group consisting of CrS, $CrS_2$, $Cr_2S_3$, $MoS_2$, FeS, $Fe_2S$, CoS, NiS, $Ni_2S$, $Cu_2S$, $Ag_2S$, ZnS, $In_2S_3$, $In_2S_2$, $GeS_x$ wherein x is a positive real number of 2.5 or less, SnS and $SnS_2$; a metal fluoride selected from the group consists of $MgF_2$, $CaF_2$ and $RhF_3$; a metal oxide selected from the group consisting of $MoO_3$, InO, $In_2O$, $In_2O_3$, and GeO; or a halide selected from the group consisting of AgI, AgBr, AgCl, $PbI_2$, $PbBr_2$, $PbCl_2$, $PbF_2$, $SnI_2$, $SnCl_2$, CuI, CuBr, CuCl, KI and KCl.

2. A thermal recording material consisting essentially of a support having thereon a recording layer thermally deformable through exposure to high intensity radiation, the recording layer comprising a vacuum deposited layer of at least one organic compound selected from the group consisting of organic carboxylic acids, salts of organic carboxylic acids, esters of organic carboxylic acids, aromatic sulfonic acids, organic acylic sulfur compounds, nitrogen-containing heterocyclic compounds, sulfur-containing heterocyclic compounds, organic macromolecular compounds selected from the group consisting of polymethacrylic acid, polystyrene, polyamides, polyvinyl alcohol, polyethyleneoxide, methyl cellulose, polyvinyl butyral, polymethylmethacrylate, polyisobutylmethacrylate, polyethylene and rosin, dyes selected from the group consisting of azo dyes, anthraquinone dyes, indigoid dyes, soluble vat dyeing dyes, sulfur dyes, carbonium dyes, quinoneimine dyes, phthalocyanine dyes, cyanine dyes, quinoline dyes, nitro dyes and nitroso dyes and pigments selected from the group consisting of phthalocyanine pigments, anthraquinone pigment and quinoline pigments, wherein said vacuum deposited layer of said at least one organic compound comprises a vacuum codeposited layer of a mixture of (a) said at least one organic compound and (b) at least one inorganic material selected from the group consisting of one or more metals, one or more inorganic compounds, and mixtures thereof.

3. The recording material of claim 1 or 2, wherein said support is a glass support, a paper support or a synthetic resin support.

4. The recording material of claim 3, wherein said support is a polyethylene terephthalate support.

5. The recording material of claim 1 or 2, wherein said organic carboxylic acid is a higher fatty acid, an aromatic ring-containing mono- or poly-carboxylic acid or an aliphatic polycarboxylic acid.

6. The recording material of claim 1 or 2, wherein said organic carboxylic acid is behenic acid, stearic acid, palmitic acid, myristic acid, benzoic acid, phthalic acid, isophthalic acid, pyromellitic acid, anisic acid, coumarinic acid, cinnamic acid, fumaric acid, succinic acid, sebasic acid, oxalic acid, pimelic acid, maleic acid, citraconic acid, mesaconic acid or abietic acid; wherein said organic carboxylic acid salt is a Na, K, Ca, Mg, Cu, Fe, Al, Co or Cr salt of the above described organic carboxylic acids; wherein said organic carboxylic acid ester is an aliphatic mono-, di- or tri-hydric alcohol ester of, an alicyclic alcohol ester of or an aromatic alcohol ester of the above described organic carboxylic acids; wherein said aromatic sulfonic acid is sulfanilic acid, p-toluenesulfonic acid, phenolsulfonic acid, catecholsulfonic acid, resorcinsulfonic acid, naphthalene-2-sulfonic acid, acenaphthene-5-sulfonic acid, benzaldehyde-2(or 3)-sulfonic acid or oxybenzylsulfonic acid; wherein said organic acyclic sulfur compound is a thiourea, a thiosemicarbazide, a thiocarbamic acid, or a thiobenzophenone; wherein said nitrogen-containing 7. The recording material of claim 2, wherein
said metal is magnesium, manganese, copper, zinc, aluminum, indium, tin or bismuth, and
said inorganic compound is a metal sulfide selected from the group consisting of CrS, $CrS_2$, $Cr_2S_3$, $MoS_2$, FeS, $Fe_2S$, CoS, NiS, $Ni_2S$, $Cu_2S$, $Ag_2S$, ZnS, $In_2S_3$, $In_2S_2$, $GeS_x$ wherein x is a positive real number of 2.5 or less, SnS and $SnS_2$; a metal fluoride selected from the group consisting of $MgF_2$, $CaF_2$ and $RhF_3$; a metal oxide selected from the group consisting of $MoO_3$, InO, $In_2O$, $In_2O_3$, and GeO; or a halide selected from the group consisting of AgI, AgBr, AgCl, $PbI_2$, $PbBr_2$, $PbCl_2$, $PbF_2$, $SnI_2$, $SnCl_2$, CuI, CuBr, CuCl, KI and KCl.

8. The recording material of claim 1, wherein said vacuum deposited layer of said at least one organic material has a thickness ranging from about 10 Å to about 10,000 Å.

9. The recording material of claim 2, wherein said vacuum codeposited layer of said mixture of said at least one organic compound and said at least one inorganic material has a thickness ranging from about 200 Å to about 1,500 Å.

10. The recording material of claim 2, wherein said inorganic compound is a metal compound.

11. The recording material of claim 1, wherein said recording material has the following layer construction in sequence:
said support;
said vacuum deposited layer of at least one organic compound;
a layer of said one or more metals, said one or more inorganic compounds or a mixture thereof;
a vacuum deposited layer of said at least one organic compound;
a layer of said one or more metals, said one or more inorganic compounds, or a mixture thereof.

12. The recording material of claim 1, wherein said at least one organic compound is selected from the group consisting of organic carboxylic acid, salts of organic carboxylic acids and esters of organic carboxylic acids.

13. The recording material of claim 1, wherein said at least one organic compound is selected from the group consisting of aromatic sulfonic acids, organic acyclic sulfur compounds and sulfur-containing heterocyclic compounds.

14. The recording material of claim 1, wherein said at least one organic compound is selected from said nitrogen-containing heterocyclic compounds.

15. The recording material of claim 1, wherein said at least one organic compounds is selected from said organic macromolecular compounds.

16. The recording material of claim 1, wherein said at least one organic compound is selected from the group consisting of dyes and pigments.

17. The recording material of claim 7, wherein said metal is selected from indium, tin and bismuth.

18. The recording material of claim 17, wherein said inorganic compound is selected from AgI, AgBr, AgCl, PbI$_2$, PPBr$_2$, PbCl$_2$, PbF$_2$, SnI$_2$, CuI, CuBr, CuCl, KI and KCl.

19. The recording material of claim 2, wherein said vacuum co-deposited layer comprises said mixture of at least one organic compound and at least one inorganic material selected from the group consisting of one or more metals, one or more inorganic compounds and mixtures thereof in a homogeneously mixed state.

20. The recording material of claim 2, which further comprises, on said vacuum co-deposited layer, a layer of at least one inorganic material selected from the group consisting of one or more metals, one or more inorganic compounds and mixtures thereof.

21. The recording material of claim 2, wherein said vacuum co-deposited layer comprises one or more inorganic compounds selected from the group consisting of metal halides and metal sulfides.

22. The recording material of claim 2, which further comprises, on said vacuum co-deposited layer, one or more inorganic compounds selected from the group consisting of metal halides and metal sulfides.

23. A process of recording information on a thermal recording material comprising a support having thereon in sequence a recording layer thermally deformable through exposure to high intensity radiation and a layer of one or more metals, a layer of one or more inorganic compounds or a layer of a mixture of said one or more metals and said one or more inorganic compounds, the recording layer comprising a vacuum deposited layer of at least one organic compound selected from a group consisting of organic carboxylic acids, salts of organic carboxylic acids, esters of organic carboxylic acids, aromatic sulfonic acids, organic acylic sulfur compounds, nitrogen-containing heterocyclic compounds, sulfur-containing heterocyclic compounds, organic macromolecular compounds selected from the group consisting of polymethacrylic acid, polystyrene, polyamides, polyvinyl alcohol, polyethyleneoxide, methyl cellulose, polyvinyl butyral, polymethylmethacrylate, polyisobutylmethacrylate, polyethylene and rosin, dyes selected from the group consisting of azo dyes, anthraquinone dyes, indigoid dyes, soluble vat dyeing dyes, sulfur dyes, carbonium dyes, quinoneimine dyes, phthalocyanine dyes, cyanine dyes, quinoline dyes, nitro dyes and nitroso dyes and pigments selected from the group consisting of phthalocyanine pigments, anthraquinone pigments and quinoline pigments, wherein said metal is magnesium, manganese, copper, zinc, aluminum, indium, tin or bismuth, and said inorganic compound is a metal sulfide selected from the group consisting of CrS, CrS$_2$, Cr$_2$S$_3$, MoS$_2$, FeS, Fe$_2$S, CoS, NiS, Ni$_2$S, Cu$_2$S, Ag$_2$S, ZnS, In$_2$S$_3$, In$_2$S$_2$, GeS$_x$ wherein x is a positive real number of 2.5 or less, SnS and SnS$_2$; a metal fluoride selected from the group consisting of MgF$_2$, CaF$_2$ and RhF$_3$; a metal oxide selected from the group consisting of MoO$_3$, InO, In$_2$O, In$_2$O$_3$, and GeO; or a halide selected from the group consisting of AgI, AgBr, AgCl, PbI$_2$, PbBr$_2$, PbCl$_2$, PbF$_2$, SnI$_2$, SnCl$_2$, CuI, CuBr, CuCl, KI and KCl, which process comprises image-wise exposing said recording material to high intensity radiation to thermally deform both said recording layer and said layer of one or more metals, said layer of one or more inorganic compounds or said layer of a mixture thereof by the heat energy of the high intensity radiation.

24. A process for recording information on a thermal recording material comprising a support having thereon a recording layer thermally deformable through exposure to high intensity radiation, the recording layer comprising a vacuum deposited layer of at least one organic compound selected from the group consisting of organic carboxylic acids, salts of organic carboxylic acids, esters of organic carboxylic acids, aromatic sulfonic acids, organic acyclic sulfur compounds, nitrogen-containing heterocyclic compounds, sulfur-containing heterocyclic compounds, organic macromolecular compounds selected from the group consisting of polymethacrylic acid, polystyrene, polyamides, polyvinyl alcohol, polyethylenoxide, methyl cellulose, polyvinyl butyral, polymethylmethacrylate, polyisobutylmethacrylate, polyethylene and rosin, dyes selected from the group consisting of azo dyes, anthraquinone dyes, indigoid dyes, soluble vat dyeing dyes, sulfur dyes, carbonium dyes, quinoneimine dyes, phthalocyanine dyes, cyanine dyes, quinoline dyes, nitro dyes and nitroso dyes and pigments selected from the group consisting of phthalocyanine pigments, anthraquinone pigments and quinoline pigments, wherein said vacuum deposited layer of said at least one organic compound comprises a vacuum co-deposited layer of a mixture of (a) said at least one organic compound and (b) at least one inorganic material selected from the group consisting of one or more metals, one or more inorganic compounds, and mixtures thereof, comprising image-wise recording said recording material to high intensity radiation to thermally deform said recording layer by the heat energy of said high intensity radiation.

* * * * *